Patented June 7, 1938

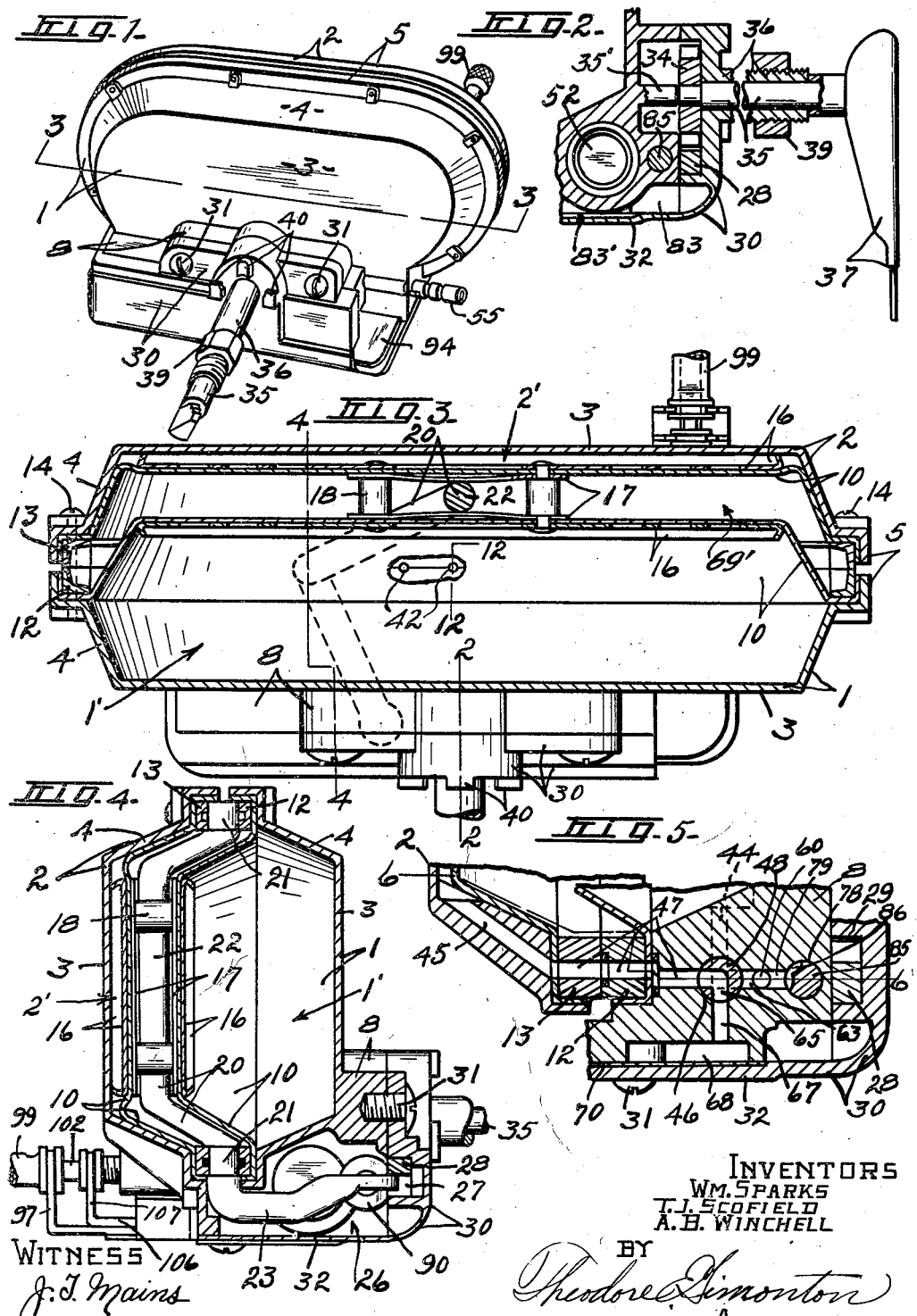

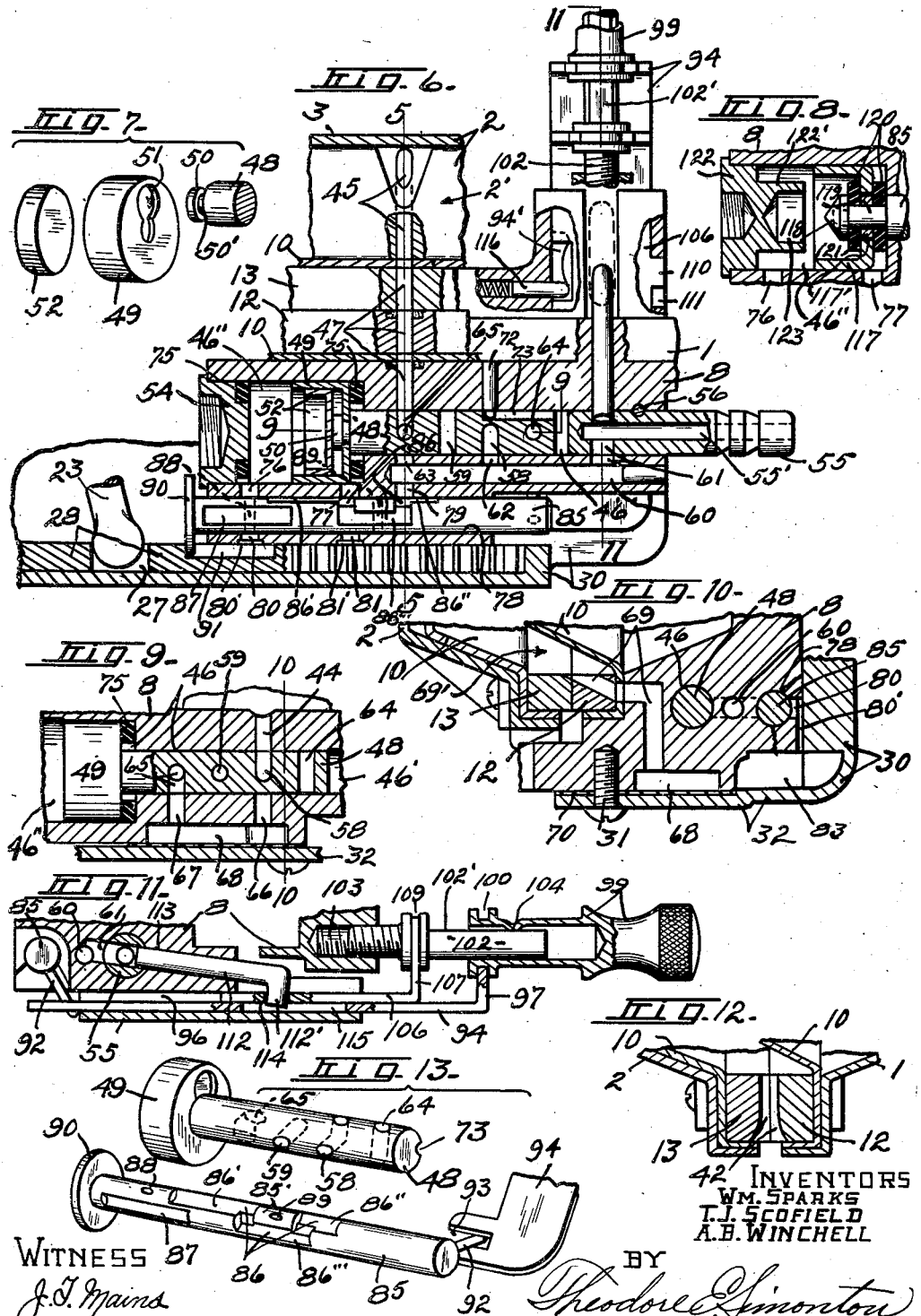

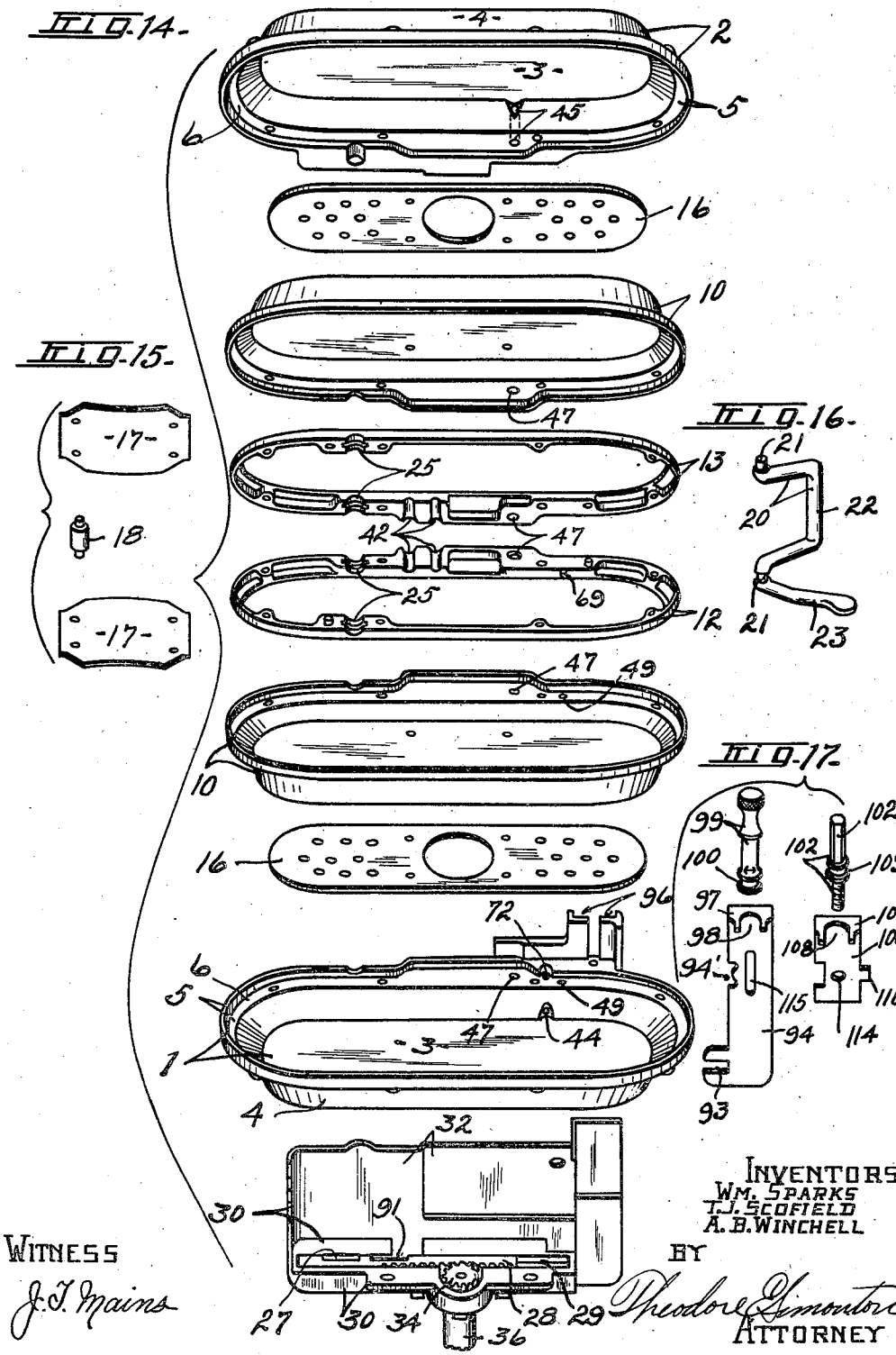

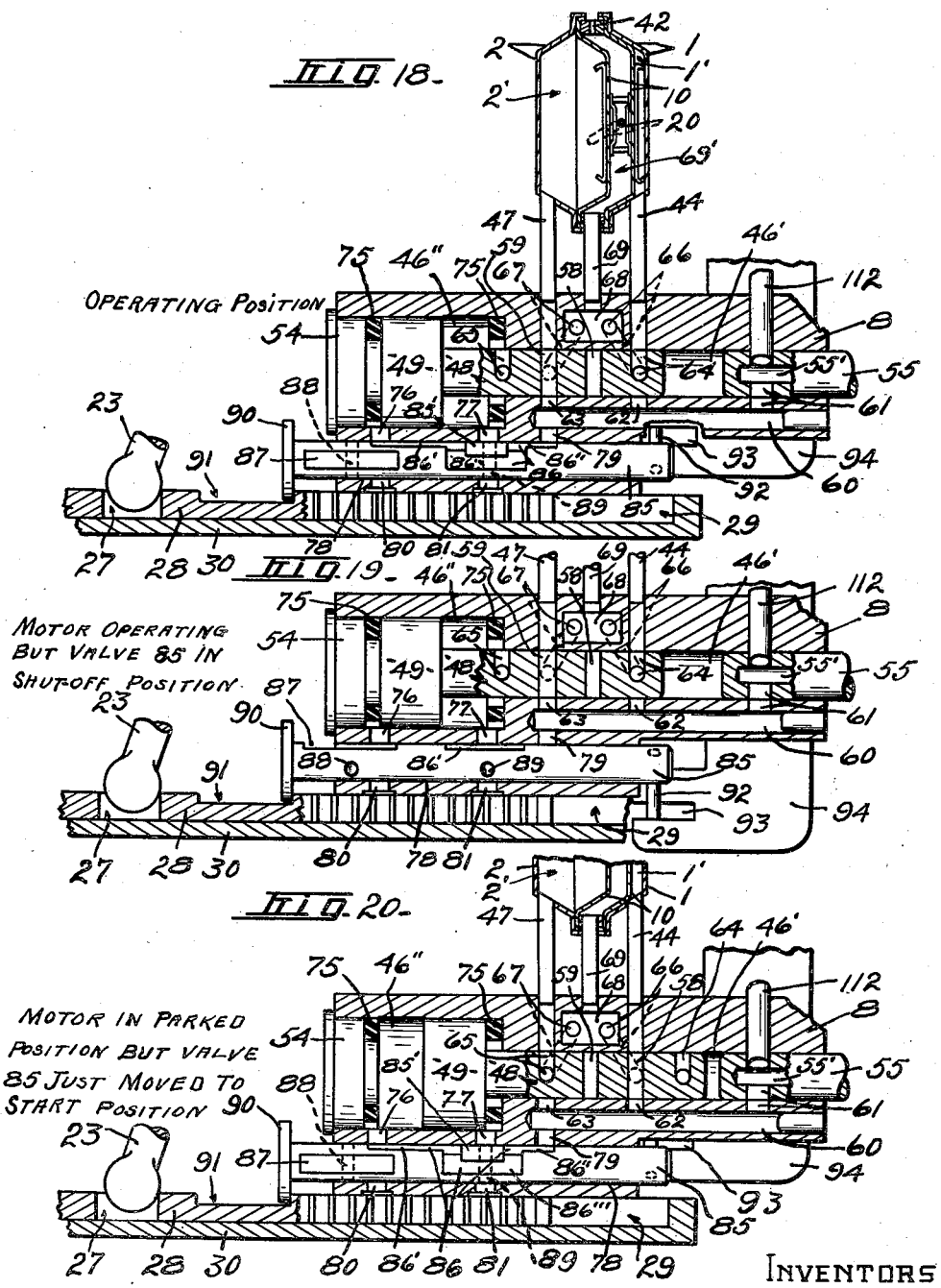

2,119,696

UNITED STATES PATENT OFFICE 2,119,696

WINDSHIELD CLEANER MOTOR

William Sparks, Theodore J. Scofield, and Arthur B. Winchell, Jackson, Mich., assignors to The Sparks-Withington Company, Jackson, Mich., a corporation of Ohio Application October 28, 1935, Serial No. 47,162
Renewed May 26, 1937

22 Claims. (Cl. 121—48)

This invention relates to certain new and useful improvements in a windshield cleaner in which a fluid pressure motor of the suction type is utilized for oscillating or otherwise moving a wiper blade or squeegee across a surface of a windshield glass.

The primary object of the invention is to produce a highly efficient windshield cleaner operating motor mechanism adapted to be operated by differential fluid pressure which is simple, durable and economical in construction.

In carrying out the above mentioned object, there is provided a pair of separate air or pressure chambers having substantially imperforate walls, except for a single fluid port, for each chamber by which the chamber may be alternately connected with a source of fluid operating pressure and with the atmosphere. The chambers are arranged in slightly spaced relation with adjacent walls thereof composed of flexible diaphragms which are rigidly connected to each other to move together. An operating member is mounted to extend between the diaphragms to be actuated thereby for operating the cleaner blade or squeegee actuating element with which the operating member is connected by means of a rack and pinion.

The outer or adjacent sides of the diaphragm are maintained in constant communication with atmospheric pressure, while the air chambers at the opposite or inner sides of the diaphragms are alternately brought into communication with a source of fluid operating pressure, such as the interior of the intake manifold of an internal combustion engine or a suction pump, and the atmosphere by means of two valve members, one of which, a main control valve, is reciprocally mounted in a valve chamber connected with each chamber port and which, in turn, is actuated by differential fluid pressure. The second valve, an auxiliary control valve, is mechanically actuated by the rack member for alternately bringing the main control valve under the influence of the suction and atmospheric pressures whereby said valve will be reciprocated by differential fluid pressure.

In addition to the above, there is provided a simple control means actuated by a common control handle whereby the speed of operation of the wiper blade may be governed independently of the means for controlling the starting and stopping of the operation of the mechanism so that when the speed control means has been adjusted, the starting and stopping of the motor may be effected without disturbing the adjustment of the speed control means.

Another specific object of the invention resides in providing a windshield cleaner of the above mentioned class which, when rendered inoperative, will automatically position the wiper blade or squeegee at one and the same side of its path of movement and maintain the same therein for providing an unobstructive clear view through the windshield.

A further object of the invention resides in providing a main control valve means of the differential fluid pressure operated type that is particularly efficient in operation.

Other objects and advantages pertaining to the structure and relation of the parts thereof will more fully appear from the following description taken in connection with the accompanying drawings in which:

Figure 1 is a perspective view of a windshield cleaner motor embodying the various features of this invention.

Figure 2 is a detail transverse sectional view taken on line 2—2, Figure 3, illustrating the outer end portion of the wiper blade operating shaft and a portion of the wiper blade carrying arm connected therewith in elevation.

Figure 3 is an enlarged longitudinal central sectional view through the diaphragm cases taken on line 3—3, Figure 1.

Figure 4 is a transverse sectional view taken on line 4—4, Figure 3.

Figure 5 is a detail transverse sectional view taken in the plane of the line 5—5, Figure 6.

Figure 6 is a detail horizontal sectional view taken substantially on line 6—6, Figure 5, and illustrating certain portions thereof broken away and in section to better illustrate the associated parts.

Figure 7 illustrates portions of the main control valve in perspective and in dis-assembled relation.

Figure 8 is a detail sectional view illustrating a modified form of main control valve together with the adjacent portion of the valve housing.

Figure 9 is a detail longitudinal sectional view taken on line 9—9, Figure 6.

Figure 10 is a detail transverse sectional view with the greater portion thereof taken substantially on line 10—10, Figure 9.

Figure 11 is a detail transverse sectional view taken on line 11—11, Figure 6.

Figure 12 is a detail sectional view taken on line 12—12, Figure 3.

Figure 13 illustrates the main control valve and the auxiliary control valve in perspective with the adjacent portion of a control member associated with the auxiliary control valve.

Figure 14 is an exploded view illustrating the diaphragm case members, diaphragms, supporting bracket and certain associated parts in perspective.

Figure 15 illustrates the outer diaphragm or bearing plates and one of the studs for fastening the same to each other and to the diaphragms.

Figure 16 is a perspective view of the crank shaft.

Figure 17 is a perspective view illustrating the control handle, the stop and go slide, speed control slide and a screw member co-acting therewith.

Figures 18, 19 and 20 are more or less diagrammatic views showing the motor and the automatic valve mechanism for controlling the action thereof and illustrating different positions of the valve members in the three figures.

The device as shown in the drawings comprises a pair of complemental diaphragm case members 1 and 2, each preferably formed of a die casting. These case members are formed oblong in plan view and each comprises a bottom wall 3 having integral outwardly tapered side walls 4 which terminate at their outer edge in a flange portion 5 L-shaped in cross section providing a marginal channel 6. One of the case members as 1 has cast integral with one longitudinal side thereof a valve housing portion 8 which will presently be more fully described.

Secured to each diaphragm case 1 and 2 is a diaphragm 10 which, in this instance, is oblong in plan view and has the marginal edge thereof seated in the marginal channel 6 of a respective diaphragm case member. The diaphragms are substantially cup-shaped in cross section as shown more clearly in Figure 14, to correspond to the cross-sectional contour of the case members 1 and 2 and have the marginal edge thereof supported in the corresponding case member by clamping rings 12 and 13 mounted in corresponding channels 6. The case members 1 and 2 are arranged in opposed relation with the flanges 5 facing each other. The rings 12 and 13, diaphragms 10 and case members 1 and 2 are secured together by clamping bolts or screws 14. The clamping rings 12 and 13 are substantially equal to or slightly greater in transverse section than the marginal channels 6 of the case members so that when the rings are secured to the case members in holding engagement with the diaphragms they will project outwardly beyond the outer edge of the corresponding flange 5 and will maintain the case members in slightly spaced relation to each other as illustrated in Figure 3.

The diaphragms 10 are preferably formed of rubberized fabric or other highly flexible material, and each has the central portion thereof supported by an inner plate 16 and an outer plate 17. The inner plates 16 are oblong in plan view and of slightly less area than the bottom walls 3 of the case members and may, as shown more particularly in Figure 14, be perforated to render the same as light in weight, as possible, consistent with sufficient rigidity to support the central portions of the diaphragms.

The outer plates 17 are preferably of considerably less length than the inner plates 16. These outer plates and the inner plates are secured to the respective diaphragms and to each other in a rigid manner whereby the diaphragms will move together by means of a plurality of, in this instance 4, shouldered studs 18 as illustrated in Figure 3. The outer plate members 17 are preferably composed of spring sheet metal and have the central portions thereof slightly bowed or curved outwardly toward each other and are spaced apart by the studs 18 a distance to operatively receive therebetween a crank shaft 20. The plates yieldingly contact the crank shaft whereby said shaft may be rocked about its axis by the diaphragms without the shaft transmitting appreciable endwise movement to the diaphragms and at the same time preventing lost motion between the crank shaft and the diaphragms.

The crank shaft 20 as illustrated more clearly in Figures 4 and 16 is provided with a pair of spaced bearing portions 21 arranged in co-axial relation with each other and a crank member 22 arranged in a plane intermediate the bearing members 21. A crank arm 23 is secured to or made integral with the crank shaft adjacent the outer end of one of the bearing members 21. The bearing members 21 are journaled in corresponding sockets or recesses 25 provided in adjacent sides of the clamping rings 12 and 13 intermediate the central portion and one end thereof. The relation of the sockets 25 to the outer or bearing plates 17 and diaphragms 10 are such that the crank portion 22 of the shaft is positioned substantially midway between the ends of the diaphragms and plates 17.

The crank arm 23 extends from the adjacent bearing member 21 laterally of the case 1 as shown in Figure 4 into a recess 26 provided adjacent the valve housing 8 and has the outer end thereof positioned in an aperture or recess 27 formed in a rack member 28. This rack member is slidably mounted for longitudinal reciprocated movement in a groove or channel 29 provided in the inner face of a supporting bracket 30 which is secured as by screws 31 to the case member, or more accurately to the valve housing portion 8 thereof. The supporting bracket 30 in this instance, is an L-shaped member as shown more particularly in Figures 4 and 14 and has one side or the bottom wall 32 thereof extending transversely of the case members 1 and 2 and which encloses the recess 26.

The rack member 28 is in meshing engagement with a pinion 34 secured to one end of a blade actuating shaft 35, as shown in Figure 2. The shaft 35 extends outwardly through the adjacent side wall of the bracket 30 and a cylindrical projection or sleeve 36 which is secured to or made integral with the bracket. The shaft and pinion are maintained against axial movement by a shoulder or stud 35′ secured to or made integral with the housing 8 (see Fig. 2). The shaft 35 may be provided with any suitable means for connecting the outer or forward end thereof with a wiper blade carrying arm as 37 which, in turn, may be of any suitable construction. The sleeve 36, in this instance, not only rotatably supports the shaft 35, but is also adapted to extend through the frame of the vehicle surrounding the windshield and may be clamped to said frame for supporting the case members 1 and 2 and associated members by means of a nut 39 screw threaded on the outer end of the sleeve, and which cooperate with a plurality of, in this instance 3, laterally projecting lugs 40, see Figure 1, provided on the outer face of the bracket 30 in concentric spaced relation to the sleeve 36 for clamping the vehicle frame therebetween.

The outer or adjacent sides of the diaphragms 10 are maintained under the constant influence of atmospheric pressure by means of one or more apertures or notches 42 formed in the adjacent surfaces of the clamping rings 12 and 13; see Figures 3, 12 and 14. The opposite or inner sides of the diaphragms, that is the sides of the diaphragms facing the case member to which they are secured, are alternately brought under the influence of a fluid-operating pressure, such as may be produced, for instance, by a suction device and the atmosphere for producing lateral movement of the diaphragms in first one direction and then in the opposite direction from within one pressure or fluid chamber 1' or 2' formed by the casings 1 and 2 and the diaphragms 10, into the other. For this latter purpose, the case members 1 and 2 are provided with a fluid port 44 and 45, respectively. One of the ports as 44 provided in the case member 1, is in direct communication with a valve chamber 46 formed in the valve case or housing 8. The other port 45 is maintained in communication with the valve chamber 46 by means of a fuel passage-way 47 which extends from the port 45 through the clamping rings 12 and 13, the adjacent portions of the diaphragms 10 and the valve housing 8, as illustrated in Figures 5 and 6.

The valve chamber 46 is circular in cross section and extends longitudinally through the housing 8 in parallel relation with the chamber 1' and consists of two portions, one 46' of relatively small diameter for the reception of a main control valve 48, and the other portion 46'' of relatively large diameter for the reception of a plunger or piston 49 as shown in Figures 6 and 9. The valve 48 in this instance, is a cylindrical member preferably composed of brass and is adapted to have a close sliding fit in the chamber portion 46' and is, as shown in Figure 7, releasably connected with the piston or plunger 49 in the following manner to permit ready assembling or dis-assembling of these members. One end of the valve 48 is provided with a reduced head 50 which is connected with the body portion of the valve by a relatively smaller neck portion 50'. The plunger 49 is a cup-shaped member having the bottom wall thereof of substantially the same thickness as the length of the neck portion 50' and is provided with a key-hole slot 51 arranged with the larger portion thereof eccentric to the plunger and adapted to receive the head 50 of the valve therethrough. The smaller portion of the slot 51 is arranged concentric with the plunger and is adapted to receive the neck 50' of the valve therein for releasably securing the valve and plunger to each other. A cup-shaped insert 52 is mounted within the plunger 49 as shown in Figure 6 and has a press fit therein for tightly sealing the interior of the plunger.

The valve chamber 46, as shown more particularly in Figure 6, extends longitudinally through the valve case or housing 8 and is closed at one end by a plug 54 mounted in the outer end of portion 46'' of the chamber in any suitable manner as by a press-fit, while the other end of the chamber is closed by an attachment nipple 55 which is mounted in the outer end of the portion 46' of the chamber. The nipple may be secured in any suitable manner to the housing 8 as by a pin 56 and is adapted to be connected by any suitable means as a flexible hose, not shown, to a source of suction. The valve 48 is provided with a pair of suction ports or passage-ways 58 and 59 arranged in slightly longitudinal spaced relation intermediate the ends of the valve 48. The spacing of these ports is considerably less than the spacings of the port 44 and the passage-way 47 and are adapted to alternately register with said port and passage-way upon longitudinal reciprocative movement of the valve for alternately connecting the chambers 1' and 2' with a suction passage 60 provided in the valve housing 8. The suction passage 60 is arranged to extend in longitudinal spaced relation with the valve chamber 46 at one side thereof, as shown in Figure 6, and is connected adjacent one end with the interior 55' of the attachment nipple 55 by means of a passage-way 61 formed in the housing 8 and nipple 55 as shown in Figure 6. The suction passage 60 is connected by ports 62 and 63 with the valve chamber portion 46' for alternately communicating with the ports 58 and 59 respectively provided in the valve 48.

The valve 48 is also provided with a pair of intake ports or passages 64 and 65 arranged one at either side of the suction ports 58 and 59. These ports 64 and 65 are adapted to alternately connect the port 44 and passage-way 47 with the atmosphere and for this purpose the valve housing 8 is provided with a pair of inlet passage-ways 66 and 67, see Figure 9, which communicate with the valve chamber 46 in alignment with the port 44 and passage-way 47, and with a common air chamber 68 formed in the housing 8 and which in turn is connected by a fluid passage-way 69 formed in the housing 8 and clamping ring 12 with the space 69' between the diaphragms 10 as shown in Figure 10, which is maintained in communication with the atmosphere by the hereinbefore mentioned notches 42 provided in the rings 12 and 13. The outer face of the air chamber 68 is closed in this instance, by the lower wall 32 of the bracket 30 as shown in Figures 9 and 10, and a gasket 70 is preferably mounted between the bracket and housing 8 to maintain a fluid-tight connection between the bracket and housing. The main supply control valve 48 is maintained against rotary movement in the chamber 46 by means of a pin 72 mounted in the housing 8, and which has one end thereof extending into a recess or groove 73 extending longitudinally of the valve in the peripheral surface thereof.

The valve 48 is reciprocated in the chamber 46 by differential fluid pressure acting on the plunger 49 which operates between a pair of buffer rings 75 positioned one at either end of the chamber portion 46'', the distance between said buffer rings being sufficient to permit the plunger to move axially in the chamber for bringing the ports 58 and 59 into alternate communication with the port 44 and passage-way 47 respectively. The chamber portion 46'' is provided with a pair of ports 76 and 77 arranged to maintain the ends of the chamber in communication with an auxiliary valve chamber 78 arranged intermediate the valve chamber 46 and the suction passage 60 in parallel relation therewith, as shown in Figure 6. The auxiliary valve chamber 78 is provided with a third port 79 arranged at one side of the ports 76 and 77 in communication with the suction passage 60. The auxiliary valve chamber 78 is also provided with a pair of atmospheric ports 80 and 81 arranged in alignment with a respective one of the ports 76 and 77 as shown in Figure 6. These ports 80 and 81 are maintained in communication with a common air chamber 83 by respective notches or recesses 80' and 81' formed in the housing 8, as shown in Figures 6 and 10. This air chamber 83 is connected with the outside atmosphere by passage 83' formed between the lower wall 32 of the bracket 30 and the adjacent portion of the valve housing 8, as shown in Figure 2.

In the auxiliary valve chamber 78 is mounted for rotary and longitudinal reciprocative movement an auxiliary valve 85 which has a close sliding fit in said valve chamber and is provided with a peripheral groove or port 86, see Figure 13, for alternately bringing ports 76 and 77 associated with the valve chamber portion 46" into communication with port 79 and, therefore, with the suction passage 60. It will be noted by referring more particularly to Figures 6 and 13 that the port 86 is composed of two spaced end portions 86' and 86" arranged in longitudinal alignment with each other separated by a portion 85' of the valve. These end portions 86' and 86" are connected with each other, as shown, by an intermediate portion 86''' arranged in circumferential spaced relation with said end portions. The valve 85 is further provided with an atmospheric groove or port 87 provided adjacent one end thereof in substantially longitudinal alignment with the intermediate portion 86''' of the port 86. This valve is also provided with a pair of atmospheric ports 88 and 89 which extend diametrically therethrough to alternately register with the ports 76 and 77, respectively, during the operation of the valve for connecting said latter ports with the atmospheric ports 80 and 81. The valve 85 extends outwardly at both ends beyond the corresponding ends of the valve chamber 78 and has the end thereof adjacent the atmospheric port 87 provided with a circular head 90 which projects outwardly beyond the sides of the valve and into an elongated slot 91 provided in the lower inner edge of the hereinbefore mentioned rack 28, as illustrated in Figures 6 and 14.

The end of the valve 85 opposite the end having the head 89 is provided with a pin 92 which projects radially therefrom into an elongated slot 93 provided in one side of a control slide 94, as shown in Figures 11, 13 and 17. The slide 94 is mounted in a transversely disposed recess 96 formed in the lower surface of the valve housing 8 adjacent one end thereof. The recess 96 has the lower open side thereof closed by the lower wall 32 of the bracket 30 which also supports the slide 94 in the recess. The slide 94 extends outwardly beyond the bracket 30 and has the outer end portion 97 bent to extend upwardly at substantially right angles to the remaining portion thereof and is provided with an inwardly extending U-shaped slot 98 for receiving therein the inner end of a control handle 99. The inner end of the control handle 99 is provided with an annular peripheral recess 100 for receiving the end portion 97 of the slide 94 therein. The handle 99 is slidably mounted upon a control screw 102 which is screw threaded in an aperture 103 provided in the adjacent portion of the valve housing 8, as shown in Figure 11. The handle 99 is secured to the screw 102 to rotate therewith by means of a shoulder 104 which slidably contacts a flattened side 102' of the screw 102.

Mounted upon the slide 94 and positioned within the recess 96 is a second slide member 106 which has the outer end portion 107 thereof bent to extend upwardly at substantially right angles to the remaining portion thereof and provided with a U-shaped recess 108 adapted to receive therein an intermediate portion of the screw 102 which, like the handle 99, is provided with an annular groove 109 for the reception of the end portion 107 of said slide. The sliding movement of the member 106 in the recess 96 is limited by a stop shoulder 110 formed on a longitudinal edge of the slide as shown in Figure 17, and which is positioned in an elongated slot 111 formed in the wall of the recess 96 as shown in Figure 6.

The slide 106 is for the purpose of operating a speed control valve 112 which, as shown in Figure 11, is slidably mounted in a suitable recess 113 extending inwardly from one side of the valve housing 8 across the passage-way 55' in the nipple 55 in alignment with the passage-way 61. The outer end of the valve 112 is provided with a lateral projection or shoulder 112' which is seated in an aperture 114 provided in the slide 106 in alignment with a longitudinally extending aperture or slot 115 provided in the control plate 94 which permits the end 112' of the valve to extend beyond the slide 106 and thereby provide for the positive connection of the valve with the relatively thin slide 106.

It will be observed that in operation the speed control slide 106 is actuated by the screw 102 as said screw is threaded to a greater or less degree into the aperture 103 for positioning the valve 112 relative to the passage-way 55'. Furthermore, it will be noted that the operation of the speed control slide and valve is effected by the handle 99 independently of the slide 94 which is also actuated by the handle 99 as said handle is moved axially along the screw 102. The longitudinal movement of the slide 94 and handle 99 is limited by a spring pressed plunger 116 mounted in the housing 8 and which engages a slot 94' provided in slide 94.

*Operation*

Let it first be assumed that the attachment nipple 55 is connected with a suitable source of vacuum or suction such as the interior of the intake manifold of an internal combustion engine, that the speed control slide 106 and valve 112 have been adjusted relative to the passageway 55' to obtain the desired speed of operation of the motor by the manipulation of the screw 102 by the rotation of handle 99 and that the stop and go slide 94 is in its outermost position as shown in Figures 11 and 18 for maintaining the motor in operation. It will be observed that when the slide 94 is in its outermost position, the valve 85 will be in the position illustrated in Figures 5, 6, 13, 18 and 20, that is, with the end portions 86" of the port 86 in communication with the port 79 connected with the suction passage 60 and the end portion 86' of the port 86 in communication with one or the other of the parts 76 and 77, depending upon the axial position of valve 85 in chamber 78, while the atmospheric port 87 in maintained out of communication with the port 76.

Considering now that valve 48 and plunger 49 are in their outermost position as shown in Figure 18 and that valve 85 and rack 91 are in the position illustrated in Figure 6, that is, with the port 77 maintained by the valve port 86 and port 79 in communication with the suction passage 60, and port 76 maintained in communication with the atmosphere by the atmospheric port 88 in the auxiliary valve so that the outer end of the plunger 49 is under atmospheric pressure while the inner end of said plunger is under the influence of air pressure below atmospheric as produced by the suction device. Then as the main control valve 48 is moved by the differential fluid pressure thus produced upon the plunger 49 to its innermost position as illustrated in Figures 6 and 20, the fluid chamber 1' will thereby be brought into communication with the source of suction by the registration of the suction port 58 with the suction passage-way 60 and with the fluid passage 44, while the fluid chamber 2' is brought into communication with the atmosphere by the registration of port 65 in the main control valve with the fuel passageway 47 and atmospheric port 67.

The diaphragms 10 which will be positioned in the pressure chamber 2', as illustrated in Figure 3, are now moved by the atmospheric pressure in chamber 2' into a similar position in the pressure chamber 1', as indicated in Figure 18, thereby producing a rocking movement of the rock shaft 20 which, in turn, produces a corresponding longitudinal movement of the rack 28 for rotating the pinion 34 and shaft 35. As the diaphragms 10 approach their innermost position within the chamber 1' the inner end of the slot 91 in rack 28, as viewed in Figures 6 and 18, will engage the head 90 and move the auxiliary valve 85 outwardly until the end portion 86' of the auxiliary valve port 86 is brought into communication with the port 76, as shown in Figure 18, in which position of the auxiliary valve the port 76 will be cut off from communication with the atmosphere and be connected with the source of suction, and the other port 77 will be cut off from communication with the source of suction by the registration therewith of the portion 85' of the valve, and brought into communication with the atmosphere through the medium of the atmospheric port 89.

It will now be observed that the atmospheric pressure upon the inner end of the plunger 49 will move the main control valve to its outermost position, see Figure 18, at which position of the valve, the fluid chamber 2' will be cut off from communication with the atmosphere and brought into communication with the source of suction by the port 59 which will then be in communication with the fluid passage-way 47 and port 63. Likewise, the fluid chamber 1' will be cut off from the source of suction and brought into communication with the atmosphere by the registration of port 64 with the fluid passage-way or port 44, whereupon the diaphragms 10 will be moved by the atmospheric pressure in the fluid or pressure chamber 1' from said chamber into the fluid or pressure chamber 2', into the position illustrated in Figures 3 and 4. As the diaphragms approach their innermost position within the chamber 2', the outer end of the slot 91 in rack 28 will engage the head 90 and move valve 85 to its innermost position as illustrated in Figure 6. As the auxiliary valve 85 approaches its innermost position, the communication of the chamber 46" at the ends of the plunger 49 with the atmosphere and source of suction will be reversed and the main supply control valve be moved thereby to its innermost position, as shown in Figure 6. As the main supply valve reaches its innermost position, the connection of the fluid or pressure chambers 1' and 2' with the atmosphere and with the source of suction will be reversed for again producing a corresponding movement of the diaphragms 10 and rack 91 actuated by the crank shaft 20.

It will thus be seen that these cycles of operation of the valves and diaphragms may be automatically continued as long as suction is maintained in the suction passage 60 or until the stop and go slide 94 is moved to its innermost position by pressure applied to the handle 99 for moving the same axially upon the screw 102. When the slide 94 is moved inwardly, the auxiliary control valve 85 will be rocked thereby, as shown in Figure 19, to bring the atmospheric port 87 into communication with the port 76, said port 87 being so constructed that whether the auxiliary valve 85 is in its innermost or its outermost position, the port 76 and outer end of the valve chamber portion 46" will be brought thereby into communication with the atmosphere. If the auxiliary valve 85 is in its innermost position, as illustrated in Figure 6, when the slide 94 is moved inwardly, it will be obvious that the ports 77 and 79 will be maintained in communication with each other by the registration of the intermediate portion 86" of the port 86 therewith and the plunger 49 and the valve 48 will be maintained thereby in their innermost positions. Consequently, the fluid or pressure chamber 2' will be maintained in communication with the atmosphere while the fluid or pressure chamber 1' will be maintained in communication with the source of suction and diaphragms 10 will be moved by the differential pressure thus produced from chamber 2' into chamber 1'.

During this movement of diaphragms 10 into chamber 1', the rack 28 is moved outwardly by the action of the crank shaft 20 thereupon in the manner hereinbefore described. As the rack approaches its outermost position, the auxiliary valve 85 will also be moved outwardly by the engagement of the inner end of the slot 91 with the head 90. As the valve 85 approaches its outermost position, it will be noted that the outer end of the chamber 46" will be maintained in communication with the atmosphere through the medium of the ports 76 and 87. The port 77, however, will be cut off from the source of suction due to the fact that the peripheral surface of the valve 85 adjacent the right hand end of the intermediate port section 86" covers the port 79 as shown in Figure 19. It, therefore, follows that the atmospheric pressure maintained at the outer end of the plunger 49 will maintain said plunger and the main control valve in their innermost position so that suction will be maintained within the chamber 1' while atmospheric pressure will be maintained in the chamber 2' and the diaphragms will thereby be maintained within the chamber 1' while the wiper blade will be maintained by the action of this differential pressure upon the diaphragms in the parked position at one side of the path of movement thereof across the windshield during the time the motor remains idle.

When the slide 94 is again moved outwardly to cause the motor to operate, the auxiliary valve 85 will be rotated thereby to bring the suction port 86 into communication with the port 79 and, therefore, the suction passage 60 and also with the port 76, as shown in Figure 20, for bringing the outer end of the piston chamber 46" in communication with the source of suction. Furthermore, the inner end of said chamber 46" will be simultaneously brought into communication with the atmosphere by the registration of the atmospheric port 89 with the port 77, thus effecting the outward movement of the plunger 49 and the main control valve 48 which will reverse the action of the differential pressure upon the diaphragms 10 and cause the motor to operate the windshield wiper blade.

Considering now that the auxiliary control valve 85 is in the outermost position when the stop and go slide 94 is moved inwardly to stop the operation of the motor, the plunger 49 and main control valve 48 will then be in their outermost positions with the result that the fluid or pressure chamber 2' will be in communication with the source of suction and the fluid or pressure chamber 1' will be in communication with the atmosphere as shown in Figure 18. It will now be understood that as the valve 85 is rotated by the slide 94, as said slide is moved inwardly, the outer end of the chamber 46", as shown in Figure 19, will be cut off from the source of suction and brought into communication with the atmosphere through the co-action of the ports 87 and 76. Furthermore, port 77 will be cut off from the atmosphere and also from the source of suction by the surface of the valve 85 adjacent the inner end of the intermediate port section 86' covering the port 79 so that valve 48 will remain in the outer position due to the inner end of chamber 46" being closed and with the air therein at atmospheric pressure.

As the diaphragms 10 approach their innermost position in the chamber 2', the rack 28 will be moved inwardly by the crank shaft 20 and as the rack approaches its innermost position, the auxiliary valve 85 will be moved to its innermost position. When the auxiliary valve has thus been moved to its innermost position, the outer end of the chamber 46" will be maintained in communication with the atmosphere by port 87, while the inner end of chamber 46" will be brought into communication with suction passage 60 due to the registration of the intermediate port section 86" with the ports 77 and 79. As soon as the inner end of the chamber 46" is thus connected with the source of suction, the atmospheric pressure in the outer end thereof will cause the plunger 49 and the main control valve 48 to be moved to their innermost position, whereupon the action of the differential pressure upon the diaphragms 10 will be reversed, the diaphragms will move toward chamber 1' and the wiper blade will thereby be moved to the same side of its path of movement as when the auxiliary valve is operated by the slide 94 when in its innermost position as hereinbefore explained, wherein the blade is maintained in the parked position by the action of the suction and atmospheric pressure upon the diaphragms 10 which will then be in the chamber 1'.

As the diaphragms approach the at rest position in chamber 1', the valve 85 will be moved to its outermost position by the rack 28 so that as the slide 94 is again moved outwardly to effect the starting of the operation of the motor, the action of the differential pressure upon the plunger 49 will be such as to move the plunger and the valve 48 connected therewith outwardly and effect the starting of the operation of the motor. It will thus be seen that the windshield wiper blade will always be maintained at one and the same side of its path of movement when the motor is shut off, and that the mechanism for controlling the speed of operation of the motor will not be affected when starting and stopping the operation of the motor so that after the valve 112 has been adjusted to obtain the desired speed of operation, this adjustment will be maintained until said valve is again moved either in one direction or the other by the rotation of the screw 102 in the aperture 103.

In Figure 8, there is shown a modified form of main control valve which pertains more particularly to the manner in which the valve proper is connected with the plunger. In this instance, the plunger as 117, has the bottom or transverse end portion thereof provided with a central opening 117' only of substantially the same diameter as the main control valve 85 for receiving the adjacent end therethrough. The valve 85 is of substantially uniform diameter throughout its length except it is provided with an annular groove or recess 119 in the periphery thereof in the end adjacent the plunger which is of substantially greater axial length than the thickness of the end of the plunger and has mounted thereon a pair of buffer washers 120 which are adapted to extend outwardly beyond the adjacent portion of the valve and the central opening in the plunger. A metal washer 121 is mounted in the recess 119 intermediate the buffer washers 120, and which is of substantially the same diameter as the plunger opening to be positioned therein. The extreme end portion as 118 of the valve 85 may be a separate member secured to the remaining portion thereof in any suitable manner to permit the assembling of the washers 120 and 121 in the recess 119. In this instance, the plug as 122 for closing the outer end of the chamber portion 46" is provided with an inwardly extending cylindrical portion 122' of less diameter than the interior diameter of the plunger 117, while the interior of this projection is provided with an aperture 123 adapted to receive the end 118 of the valve therein, whereby the inner end of the projection 122' will be engaged by the buffer washers 120 within the plunger for absorbing the shock as said plunger is moved to its outermost position.

Although there is shown and particularly described the preferred embodiment of this invention, it is not wished to be limited to the exact construction shown as various changes both in the form and relation of the parts thereof may readily be made and the differential fluid pressure for operating the diaphragms 10 and valve 48 may as readily be produced from a source above atmospheric pressure as from below atmospheric pressure without departing from the spirit of the invention as set forth in the appended claims.

We claim:

1. A motor adapted to be operated by differential fluid pressure for windshield cleaners wherein a wiper blade is moved back and forth through a predetermined path across a face of the windshield and comprising in combination, a pair of diaphragm supporting case members, each case member having a recess in one side thereof, a pair of flexible diaphragms, one for each case member arranged to extend across a corresponding recess, spacing means for separating a case member and diaphragm from the other case member and diaphragm engaging the marginal portion of said diaphragms, fastening means for securing the case members, spacing means and diaphragms to each other with the diaphragms arranged adjacent each other in slightly spaced relation, a crank shaft journaled in the spacing means to rotate about a predetermined axis, resilient means engaging the crank shaft to the central portion of the diaphragms at one side of the axis of rotation of said crank shaft, means for operatively connecting the crank shaft with the wiper blade, and fluid conveying means including automatic valve means for alternately connecting the recesses with fluids of different pressures for actuating the diaphragms.

2. A motor adapted to be operated by differential fluid pressure for windshield cleaners wherein a wiper blade is moved back and forth through a predetermined path across the face of the windshield and comprising in combination a pair of diaphragm supporting case members, each case member having a recess in one side thereof, a pair of flexible diaphragms, one for each case member arranged to extend across a corresponding recess, spacing means for separating a case member and diaphragm from the other case member and diaphragm engaging the marginal portion of the diaphragms, fastening means for securing the case members, spacing means and diaphragms to each other with the diaphragms arranged adjacent each other in slightly spaced relation, a crank shaft positioned intermediate the diaphragms and journaled in opposite sides of the spacing means, means rigidly connecting the central portions of the diaphragms to each other to cause said diaphragms to move together, said connecting means including a spring element yieldingly engaging the crank shaft for operatively connecting the crank shaft and diaphragms to each other, means operatively connecting the crank shaft with the wiper blade, and fluid conveying means including automatic valve means for alternately connecting the recesses with atmospheres of different pressures for actuating the diaphragms.

3. A motor adapted to be operated by differential fluid pressure for windshield cleaners wherein a wiper blade is moved back and forth through a predetermined path across a face of the windshield and comprising in combination, a pair of diaphragm supporting case members, each case member having a recess in one side thereof, a pair of flexible diaphragms, one for each case member arranged to extend across a corresponding recess, fastening means including spacing rings engaging the marginal portion of the diaphragms for securing the case member and diaphragms to each other with the diaphragms arranged adjacent each other in slightly spaced relation, at least one of said spacing rings having an atmospheric port in communication with the space intermediate said diaphragms, actuating means operatively connecting the diaphragms with the wiper blade, a valve housing connected with one of the case members having a suction passage therein adapted to have communication with the case recesses and a pair of intake passages in communication with the interior of the spacing rings intermediate the diaphragms, and valve means controlled by the operation of said actuating means for alternately bringing the case recesses into communication with the suction passages and with the intake passages for actuating the diaphragm.

4. A mechanism for cleaning windshields wherein a wiper element is moved back and forth through a predetermined path across the face of the windshield and comprising in combination, a pair of diaphragm supporting case members mounted in opposed slightly spaced relation, a pair of diaphragms, one for each case member mounted on the adjacent surfaces of said case members to form respective fluid pressure chambers, a crank shaft extending between the diaphragms and rotatably connected with the case members at opposite sides of the diaphragms, means fixedly connecting the central portions of the diaphragms to each other to cause them to move together including a pair of spring plates having yielding engagement with opposite sides of the crank shaft and operatively connecting the crank shaft to the diaphragms, an arm connected with the crank shaft, a rack member mounted for rectilinear reciprocative movement connected with the arm to be actuated thereby, means including a pinion gear for operatively connecting the rack with the wiper element, and fluid conveying means including automatic valve means for alternately connecting the pressure chambers with a source of suction and with the atmosphere.

5. A valve mechanism for a windshield cleaner wherein a wiper blade is moved back and forth through a predetermined path across a face of the windshield and comprising in combination, a pair of diaphragm supporting case members, means for securing said case members to each other in slightly spaced relation, a pair of diaphragms, one for each case member, secured to the adjacent sides of said members, a crank shaft rotatably connected with the case members to extend between said diaphragms, means yieldingly engaging the diaphragms with the crank shaft whereby motion of the diaphragms will rock said crank shaft, an arm connected with the crank shaft to extend at one side of the case members, a supporting bracket adapted to encase the arm secured to one of the case members, a rack reciprocably mounted in said bracket in operative engagement with the arm, and means actuated by the rack for operating the wiper blade.

6. In a valve mechanism for a windshield cleaner motor having a pair of fluid pressure chambers, in combination, operating means associated with said pressure chambers adapted to be actuated by differential fluid pressure for operating a wiper blade, a suction passage connected with each pressure chamber, means including a main control valve in said suction passage for alternately connecting the pressure chambers with a source of suction and with the atmosphere, means for operating said main control valve comprising a plunger of greater cross sectional area than the valve, means connecting said plunger with the valve, means including an auxiliary control valve for alternately connecting opposite ends of the plunger with the source of suction and with the atmosphere, and means actuated by the operating means for operating said auxiliary valve.

7. A valve mechanism for a fluid pressure motor of the suction type for operating a windshield cleaner blade and comprising a housing having a valve chamber, said chamber having separate fluid passages for connecting the same with the pressure chambers of the motor, with the atmosphere, and with a source of suction, a main supply control valve reciprocally mounted in the valve chamber and having suction and intake ports associated therewith co-acting with said fluid passages for alternately connecting the pressure chambers with the source of suction and with the atmosphere, a piston secured to the valve having a greater cross sectional area than said valve, and means for alternately connecting opposite sides of the piston with the source of suction and with the atmosphere.

8. In a valve mechanism for a windshield cleaner motor or the like wherein the drive element is operated by the application of operating fluids of different pressures controlled by a main fluid supply control valve, in combination, means for governing the operation of said main control valve comprising a piston operatively connected with the valve, and means including an auxiliary control valve for alternately connecting opposite ends of the piston with a source of fluid operating pressure and with the atmosphere for actuating said piston.

9. In a valve mechanism for a windshield cleaner motor or the like wherein the drive element is operated by the application of fluids of different pressures controlled by a main fluid supply control valve, in combination, means for governing the operation of said main control valve comprising a piston chamber, a piston mounted in said chamber and connected with the main control valve to move therewith, an auxiliary control valve chamber, a pair of fluid passages connecting the auxiliary control valve chamber with the piston chamber at opposite ends of the piston, an auxiliary control valve mounted in the control valve chamber for rotary and reciprocative movements, a suction passage in communication with the auxiliary control valve chamber, said auxiliary control valve having a port in constant communication with the atmosphere normally spaced from but adapted to register with at least one of said fluid passages upon rotation of said valve and additional ports adapted when the valve is in the normal operating position to cooperate with said fluid passages during the reciprocating movement of the valve to alternately connect opposite ends of the piston chamber with the suction passage and with the atmosphere for actuating said piston, and manually operated control means connected with the auxiliary control valve for rotating said valve to alter the relation of the valve ports with said pair of fluid passages whereby one end of the piston chamber will be maintained in constant communication with the atmosphere during the reciprocating movement of the auxiliary control valve for maintaining the piston and the main supply control valve at one end of their path of movement.

10. In a motor adapted to be operated by differential fluid pressure for windshield cleaners having a wiper element, comprising casing means forming a pair of pressure chambers, actuating means connected with the casing means and associated with said chambers adapted to be operated by differential fluid pressure for reciprocating the wiper element, means for alternately connecting said chambers with a source of fluid operating pressure and with the atmosphere comprising fluid passages and a main supply valve operatively associated with said fluid passages, means for reciprocating said supply valve by differential fluid pressure comprising an auxiliary control valve, means operated by the actuating means for automatically operating the auxiliary control valve, a control element connected with the auxiliary control valve for rotatably moving said valve relative to the fluid passages for maintaining the main control valve at one end of its path of movement by differential fluid pressure, a valve means associated with the fluid passages for controlling the speed of operation of the actuating means, single handle means operatively connecting the handle with the control element and with the speed control valve for operating said element and valve independently of each other.

11. A control means for a fluid pressure motor having a suction passage and automatic valve means for alternately connecting the pressure chambers of the motor with the suction passage and with the atmosphere comprising in combination, a control element operatively connected with the valve means for effecting the starting and stopping of the motor, a separate valve means associated with the suction passage for governing the speed of operation of the motor and a single handle means connected with the control element and with the speed control valve means for operating the same independently of each other.

12. A control means for a fluid pressure motor having a suction passage, a main control valve means associated with the suction passage adapted to be actuated by differential fluid pressure for alternately connecting the pressure chambers of the motor with the suction passage and with the atmosphere and an auxiliary control valve means also associated with the suction passage adapted to govern the operation of the main control valve means by directing different atmospheric pressures thereto and comprising in combination, a control element operatively connected with the auxiliary control valve means to alter the relation of the auxiliary valve with the main control valve means to effect the starting and stopping of the motor, separate valve means associated with the suction passage for governing the speed of operation of the motor, and a single handle means connected with said control element and with the speed control valve means for operating the same independently of each other.

13. In a windshield cleaner motor adapted to be operated by fluid pressure, in combination, a drive element, fluid pressure chambers, operating means operatively connected with the element and actuated by fluid pressure in said chambers for actuating said element, a conduit for connection with a source of fluid pressure, valve means for alternately placing said chambers in communication with said conduit comprising a main supply valve actuated by fluid pressure, fluid conveying means including an auxiliary control valve mounted for both reciprocative and rotary movements operatively connecting the main supply valve with said conduit, mechanical means operatively connecting the auxiliary control valve with said operating means for positively actuating said auxiliary valve in one of said directions of movement to intermittently effect operation of the main supply valve, and manually operated means connected with the auxiliary valve independently of said fluid pressure and of said operating means for actuating said valve through the other one of said directions of movement whereby, the pressure fluid will be directed to the main supply valve to hold said latter valve stationary.

14. In a windshield cleaner motor adapted to be operated by fluid pressure, in combination, a drive element, fluid pressure chambers, operating means operatively connected with the element and actuated by fluid pressure in said chambers for actuating said element, a conduit for connection with a source of fluid pressure, valve means for alternately placing said chambers in communication with said conduit comprising a main supply valve actuated by fluid pressure, fluid conveying means including an auxiliary control valve mounted for both reciprocative and rotary movements operatively connecting the main supply valve with said conduit, mechanical means operatively connecting the auxiliary control valve with said operating means for positively reciprocating said auxiliary valve to intermittently effect operation of the main supply valve, and manually operated means connected with the auxiliary valve independently of said fluid pressure and of said operating means for rotating said valve whereby, the main supply valve will be maintained stationary by the action of the fluid pressure thereon.

15. In a windshield cleaner motor or the like adapted to be operated by fluid pressure, a drive element, fluid pressure chambers, operating means operatively connected with the drive element and actuated by pressure in said chambers for actuating said element through a definite cycle of operation, valve means for alternately placing said chambers in communication with a source of pressure fluid and with an exhaust for said fluid comprising a control valve member mounted for both reciprocative and rotary movements, mechanical means operatively connecting the valve member with said operating means for positively actuating the valve member in one of said directions of movement to effect continued operation of the drive element, and manually operated control means connected with the valve member independently of said fluid pressure and of said operating means for producing operation of the valve in the second one of said directions of movement to effect stopping of the drive element at a predetermined position only in the cycle of movement thereof independently of the operation of the control valve member.

16. In a motor for operating a windshield cleaner wiper element or the like wherein a drive means associated with fluid chambers is operated by the application of operating fluids of different pressures in said chambers, in combination, a drive shaft for the wiper element mounted to rotate about a predetermined axis, coacting means mounted exteriorly of said fluid chambers, operatively connecting the drive means with the shaft including a reciprocating member, fluid conveying means for controlling the application of fluid pressure to the drive means comprising a main fluid supply control valve means adapted to be actuated through a definite cycle of movement by fluids of different pressures, a chamber therefor, an auxiliary control valve chamber, a pair of fluid passages connecting said chambers, separate fluid passages including a conduit connecting the auxiliary control valve chamber with a source of operating fluid pressure and with an exhaust therefor, an auxiliary control valve mounted in said latter chamber, and means connecting the auxiliary control valve with the reciprocating member including cooperating drive and driven elements having a lost motion therebetween during a portion only of the cycle of operation of the reciprocating member whereby the auxiliary valve is intermittently actuated by said member to alternately connect said pair of fluid passages with the operating fluid in said conduit and with the exhaust for actuating the main supply control valve.

17. In a motor for operating a windshield cleaner wiper element or the like wherein a drive means associated with fluid chambers is operated by the application of operating fluids of different pressures in said chambers, in combination, a drive shaft for the wiper element mounted to rotate about a predetermined axis, coacting means mounted exteriorly of said fluid chambers, operatively connecting the drive means with the shaft including a reciprocating member, fluid conveying means for controlling the application of fluid pressure to the drive means comprising a main fluid supply control valve means adapted to be actuated through a definite cycle of movement by fluids of different pressures, a chamber therefor, an auxiliary control valve chamber, a pair of fluid passages connecting said chambers, separate fluid passages including a conduit connecting the auxiliary control valve chamber with a source of operating fluid pressure and with an exhaust therefor, an auxiliary control valve mounted in said latter chamber for rotary and reciprocative movements, said auxiliary control valve having a port in constant communication with the atmosphere normally spaced from but adapted to register with one of said pair of fluid passages upon rotation of said valve and additional ports adapted when the valve is in the normal operating position to cooperate with said fluid passages during the reciprocating movement of the valve to alternately connect the pair of fluid passages with the operating fluid in said conduit, and with the exhaust to effect operation of the main supply control valve, and manually operated control means connected with the auxiliary control valve for rotating said valve to alter the relation of the valve ports with said fluid passages whereby the main supply control valve will be constantly subjected to the influence of atmospheric pressure during the reciprocating movement of the auxiliary control valve and be maintained thereby in one position of its cycle of movement.

18. In a motor for a windshield cleaner or the like, casing means forming a diaphragm support and a valve support arranged at one side of the diaphragm support, a drive member adapted to be operatively connected with a cleaner element supportably connected with said casing means, a pair of flexible diaphragms connected with the diaphragm support to form spaced fluid-tight vacuum chambers at the adjacent side of the diaphragms, the opposite side of each diaphragm being permanently exposed to atmospheric pressure, means mounted exteriorly of the vacuum chambers and including a reciprocating member for operatively connecting the diaphragms and drive element to each other to cause said drive element to be operated by the action of the diaphragms, a suction conduit connected to the valve support, valve passages for alternately connecting the vacuum chambers with the suction conduit and with the atmosphere including a main supply control valve adapted to be actuated by fluid pressure, an auxiliary control valve for operatively connecting the main supply valve means with the suction conduit and with the atmosphere, and drive means operatively connecting said reciprocating member to the auxiliary control valve, said drive means including cooperating drive and driven elements having a lost motion therebetween during a portion only of the cycle of operation of said drive element whereby said valve is intermittently actuated by the reciprocating member.

19. A motor adapted to be operated by fluid pressure for windshield cleaners wherein a wiper blade is moved back and forth through a predetermined path across the face of the windshield and comprising in combination a pair of diaphragm supporting case members, a pair of flexible diaphragms, one for each case member, spacing means for separating a case member and diaphragm from the other case member and diaphragm, fastening means securing the case members, spacing means and diaphragms to each other with the diaphragms arranged adjacent each other to form spaced fluid pressure chambers, a drive element connected with the case members to rotate about a predetermined axis, resilient means releasably engaging the drive element to the central portion of the diaphragms at one side of the axis of rotation of said element, means for operatively connecting the drive element with the wiper blade, and fluid conveying means including automatic valve means responsive to the drive element for alternately connecting the pressure chambers with fluids of different pressures for actuating the diaphragms.

20. A mechanism for cleaning windshields wherein a wiper element is moved back and forth through a predetermined path across the face of the windshield and comprising in combination a pair of diaphragm supporting case members mounted in opposed slightly spaced relation, a pair of diaphragms one for each case member mounted on the adjacent surfaces of said case members to form respective fluid pressure chambers, a crank shaft extending between the diaphragms and rotatably connected with the case members to rotate about a predetermined axis, means fixedly connecting the central portions of the diaphragms to each other to cause them to move together including a pair of resilient members releasably engaging the crank shaft for operatively connecting the crank shaft to the diaphragms whereby motion of the diaphragms will rock said crank shaft, means operatively connecting the crank shaft with the wiper element, and fluid conveying means including automatic valve means having a member responsive to the crank shaft for alternately connecting the pressure chambers with a source of fluid operating pressure and with an exhaust for said pressure.

21. In a fluid pressure operated motor for a windshield cleaner wiper element or the like, in combination, a casing means forming a diaphragm support and a valve support arranged at one side of the diaphragm support, a pair of flexible diaphragms secured to the diaphragm support to provide separate fluid-tight pressure chambers, one chamber being arranged at one side of each of the diaphragms and the opposite side of each diaphragm being permanently exposed to atmospheric pressure, a drive element connected with the casing means to rotate about an axis extending substantially parallel with the direction of movement of the diaphragms, means mounted exteriorly of the pressure chambers operatively connecting the drive element with the diaphragms comprising a member operatively connected with the drive element to rotate therewith, a second member operatively connected to the first mentioned member and supported by the casing to reciprocate in a direction substantially normal to the direction of movement of the diaphragms, means mounted exteriorly of the pressure chambers operatively connecting the diaphragms and said second member to each other, and fluid conveying means including an automatic valve mechanism supported by the valve support exteriorly of the pressure chambers and controlled by the operation of said second member for alternately connecting the pressure chambers with a source of fluid operating pressure and with an exhaust for said operating pressure.

22. In a fluid pressure motor for operating a windshield cleaner element or the like comprising fluid pressure chambers, operating means associated with said chambers adapted to be operated by fluid pressure for actuating said cleaner element, a conduit for connection with a source of fluid pressure, valve means for alternately placing said chambers in communication with said conduit comprising a main supply valve actuated by fluid pressure and an auxiliary valve actuated by said operating means for controlling the operation of the main supply valve, and manually operated mechanical means connected with said auxiliary valve independently of said fluid pressure and of said operating means for controlling the operation of said valve means.

WILLIAM SPARKS.
THEODORE J. SCOFIELD.
ARTHUR B. WINCHELL.